(12) United States Patent
Nie et al.

(10) Patent No.: US 12,210,970 B2
(45) Date of Patent: *Jan. 28, 2025

(54) SYSTEM AND METHOD FOR IMPROVING USER ENGAGEMENT BASED ON USER SESSION ANALYSIS

(71) Applicant: eBay Inc., San Jose, CA (US)

(72) Inventors: Keyu Nie, Mountain View, CA (US); Yang Zhou, San Jose, CA (US); Zezhong Zhang, Campbell, CA (US); Tao Yuan, Cupertino, CA (US); Qian Wang, San Jose, CA (US); Giorgio Ballardin, San Jose, CA (US); Liren Sun, San Francisco, CA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,701

(22) Filed: Oct. 3, 2022

(65) Prior Publication Data

US 2023/0045105 A1 Feb. 9, 2023

Related U.S. Application Data

(63) Continuation of application No. 16/252,862, filed on Jan. 21, 2019, now Pat. No. 11,494,635.

(Continued)

(51) Int. Cl.
*G06N 3/08* (2023.01)
*G06N 7/01* (2023.01)

(52) U.S. Cl.
CPC ............... *G06N 3/08* (2013.01); *G06N 7/01* (2023.01)

(58) Field of Classification Search
CPC .. G06N 3/00; G06N 3/02; G06N 3/08; G06N 3/0895; G06N 3/09; G06N 3/091;

(Continued)

(56) References Cited

U.S. PATENT DOCUMENTS 8,301,623 B2 10/2012 Chakrabarti et al.
8,600,968 B2 12/2013 Holenstein et al.
(Continued)

FOREIGN PATENT DOCUMENTS

CN 108399201 8/2018
CN 113168428 6/2024
(Continued)

OTHER PUBLICATIONS

Sakar et al. "Real-time prediction of online shoppers' purchasing intention using multilayer perceptron and LSTM recurrent neural networks", 2018 https://link.springer.com/article/10.1007/s00521-018-3523-0 (Year: 2018).*

(Continued)

*Primary Examiner* — Kamran Afshar
*Assistant Examiner* — Lokesha G Patel
(74) *Attorney, Agent, or Firm* — SCHWEGMAN LUNDBERG & WOESSNER, P.A.

(57) ABSTRACT

A server accesses a plurality of users' sessions with the web server. Each user session indicating a page flow of a corresponding user session for a plurality of web pages provided by the web server. The server generates a learning model using a neural network based on the plurality of users' sessions. The learning model is configured to predict a next user activity based on a current page flow of a current user session. The next user activity indicating one of continuing the current user session by visiting another web page provided by the web server and ending the current user session. The server dynamically adjusts a content of a web page based on the predicted next user activity.

20 Claims, 12 Drawing Sheets

Related U.S. Application Data

(60) Provisional application No. 62/743,469, filed on Oct. 9, 2018.

(58) Field of Classification Search
CPC ........ G06N 3/092; G06N 3/094; G06N 3/096; G06N 3/098; G06N 3/0985; G06N 5/02; G06N 5/04; G06N 7/00; G06N 7/04; G06N 20/00; G06N 20/10; G06N 20/20; G06N 7/01
See application file for complete search history.

(56) References Cited

U.S. PATENT DOCUMENTS

| | | | |
|---|---|---|---|
| 8,645,212 | B2 | 2/2014 | Urban |
| 8,862,977 | B2 | 10/2014 | Suzuki et al. |
| 8,903,909 | B1 | 12/2014 | Marra et al. |
| 9,747,384 | B1 | 8/2017 | Rao et al. |
| 10,089,654 | B1* | 10/2018 | Chang .................. G06F 40/143 |
| 10,095,888 | B1 | 10/2018 | Lee et al. |
| 10,740,778 | B1 | 8/2020 | Nair et al. |
| 10,977,711 | B1 | 4/2021 | Verma et al. |
| 11,494,635 | B2 | 11/2022 | Nie et al. |
| 2010/0191619 | A1* | 7/2010 | Dicker ............... G06Q 30/0603 705/26.1 |
| 2013/0073379 | A1 | 3/2013 | Srinivasan et al. |
| 2014/0214483 | A1 | 7/2014 | Minnis et al. |
| 2016/0335351 | A1 | 11/2016 | Volkovs et al. |
| 2017/0004542 | A1* | 1/2017 | Farahat ............... G06Q 30/0275 |
| 2019/0236679 | A1 | 8/2019 | Kumar et al. |
| 2019/0362409 | A1 | 11/2019 | Srinivasan et al. |
| 2020/0107538 | A1 | 4/2020 | Preheim et al. |
| 2020/0110998 | A1 | 4/2020 | Nie et al. |

FOREIGN PATENT DOCUMENTS

| | | |
|---|---|---|
| KR | 20040077398 | 9/2004 |
| WO | 2020076386 | 4/2020 |

OTHER PUBLICATIONS

Ding et al. "Learning User Real-Time Intent for Optimal Dynamic Webpage Transformation", 2015 https://www.researchgate.net/publication/271373754_Learning_User_Real-Time_Intent_for_Optimal_Dynamic_Web_Page_Transformation (Year: 2015).*
"International Application Serial No. PCT US2019 041336, International Search Report mailed Feb. 11, 2020", 4 pgs.
"International Application Serial No. PCT US2019 041336, Written Opinion mailed Feb. 11, 2020", 7 pgs.
"International Application Serial No. PCT US2019 041336, International Preliminary Report on Patentability mailed Apr. 22, 2021", 9 pgs.
"U.S. Appl. No. 16/252,862, Non Final Office Action mailed Jul. 1, 2021", 90 pgs.
"U.S. Appl. No. 16/252,862, Examiner Interview Summary mailed Oct. 1, 2021", 3 pgs.
"U.S. Appl. No. 16/252,862, Final Office Action mailed Dec. 2, 2021", 91 pgs.
"U.S. Appl. No. 16/252,862, Examiner Interview Summary mailed Feb. 7, 2022", 3 pgs.
"U.S. Appl. No. 16/252,862, Non Final Office Action mailed Feb. 25, 2022", 30 pgs.
"U.S. Appl. No. 16/252,862, Notice of Allowance mailed Jul. 1, 2022", 10 pgs.
"European Application Serial No. 19870420.7, Extended European Search Report mailed Jul. 13, 2022", 8 pgs.
"Chinese Application Serial No. 201980081331.3, Office Action malled Jul. 25, 2023", With English machine translation, 35 pgs.
Asenjo, "Web User Behavior Analysis", (2011), 213 pages.
Charpate, "Prediction of Link and Path for Users Web Browsing Using Markov Model", International Journal of Computer Science and Mobile Computing, vol. 4, No. 2, (2015), pp. 144-148.
Davison, D. Brian, "Learning Web Request Patterns", In: Web Dynamics 2004, Springer, (Jul. 2004), 435-459.
Faraday, "Visually Critiquing Web Pages", https: link.springer.com chapter 10.1007 978-3-7091-6771-7_17, (2000).
Harley, "Animation for Attention and Comprehension", https: www.nngroup.com articles animation-usability , (Sep. 2014).
Moe, "Dynamic Conversion Behavior at E-Commerce Sites", https: repository.upenn.edu cgi viewcontent.cgi?article=1425andcontext=marketing_papers, (2004).
Navalpakkam, Vidhya, "Mouse Tracking: Measuring and Predicting Users Experience of Web Based Content", https: dl.acm.org doi pdf 10.1145 2207676.2208705, (May 2012).
Nizamuddin, "IPFS-Blockchain-based Authenticity of Online", Department of Electrical and Computer Engineering, Khalifa University of Science, Technology and Research, (Jun. 18, 2018), 16 pages.
Sakar, Oran C, "Real-time prediction of online shoppers purchasing intention using multilayer perceptron and LSTM recurrent neural networks", Neural Computing and Applications, Springer London, London, vol. 31, No. 10, XP036911074, (May 9, 2018), 6893-6908.
Zolna, Konrad, "user2vec: user modeling using LSTM networks. Jagiellonia n University and RTB House", Retrieved from the Internet: URL:https: techblog.rtbhouse.com files user 2vec-slides.pdf. On [retrieved on Nov. 13, 2019], (Jun. 24, 2016), 1-20.
"Chinese Application Serial No. 201980081331.3, Office Action mailed Nov. 14, 2023", w/English Translation, 13 pgs.
"European Application Serial No. 19870420.7, Communication Pursuant to Article 94(3) EPC mailed Nov. 22, 2023", 9 pgs.

* cited by examiner model.summary()

| Layer (type) | Output Shape | Param # | Connected to |
|---|---|---|---|
| embedding_2 (Embedding) | (10240, 6, 42) | 43302 | embedding_input_2[0][0] |
| batchnormalization_2 (BatchNorma | (10240, 6, 42) | 168 | embedding_2[0][0] |
| lstm_2 (LSTM) | (10240, 6, 256) | 306176 | batchnormalization_2[0][0] |
| timedistributed_2 (TimeDistribut | (10240, 6, 1031) | 264967 | lstm_2[0][0] |

Total params: 614,613
Trainable params: 614,529
Non-trainable params: 84

FIG. 4 ically adjusting content in a web page in accordance with one
SYSTEM AND METHOD FOR IMPROVING USER ENGAGEMENT BASED ON USER SESSION ANALYSIS

RELATED APPLICATION

The present application is a Continuation of U.S. application Ser. No. 16/252,862, filed Jan. 21, 2019, which claims the benefit of priority to U.S. Application Ser. No. 62/723,468, filed Oct. 9, 2018, each of which is herein incorporated by reference in its entirety.

TECHNICAL FIELD

The subject matter disclosed herein generally relates to a special-purpose machine that uses machine learning applied to user session activities to predict a user's next activity, including computerized variants of such special-purpose machines and improvements to such variants, Specifically, the present disclosure addresses systems and methods for improving user engagement based on user session analysis.

BACKGROUND

When browsing or searching for an item using a computing search engine operating on a server, users visit a series of web pages until they have identified a pertinent web page featuring the item that they wish to view. A session flow includes a series of web pages visited by the user during a user session. Some users may find the item they are searching for, while other users may give up their search and abruptly end their user session (for example, by closing their web browser).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a table illustrating a model structure summary in accordance with one embodiment.

DETAILED DESCRIPTION

Figure 1:
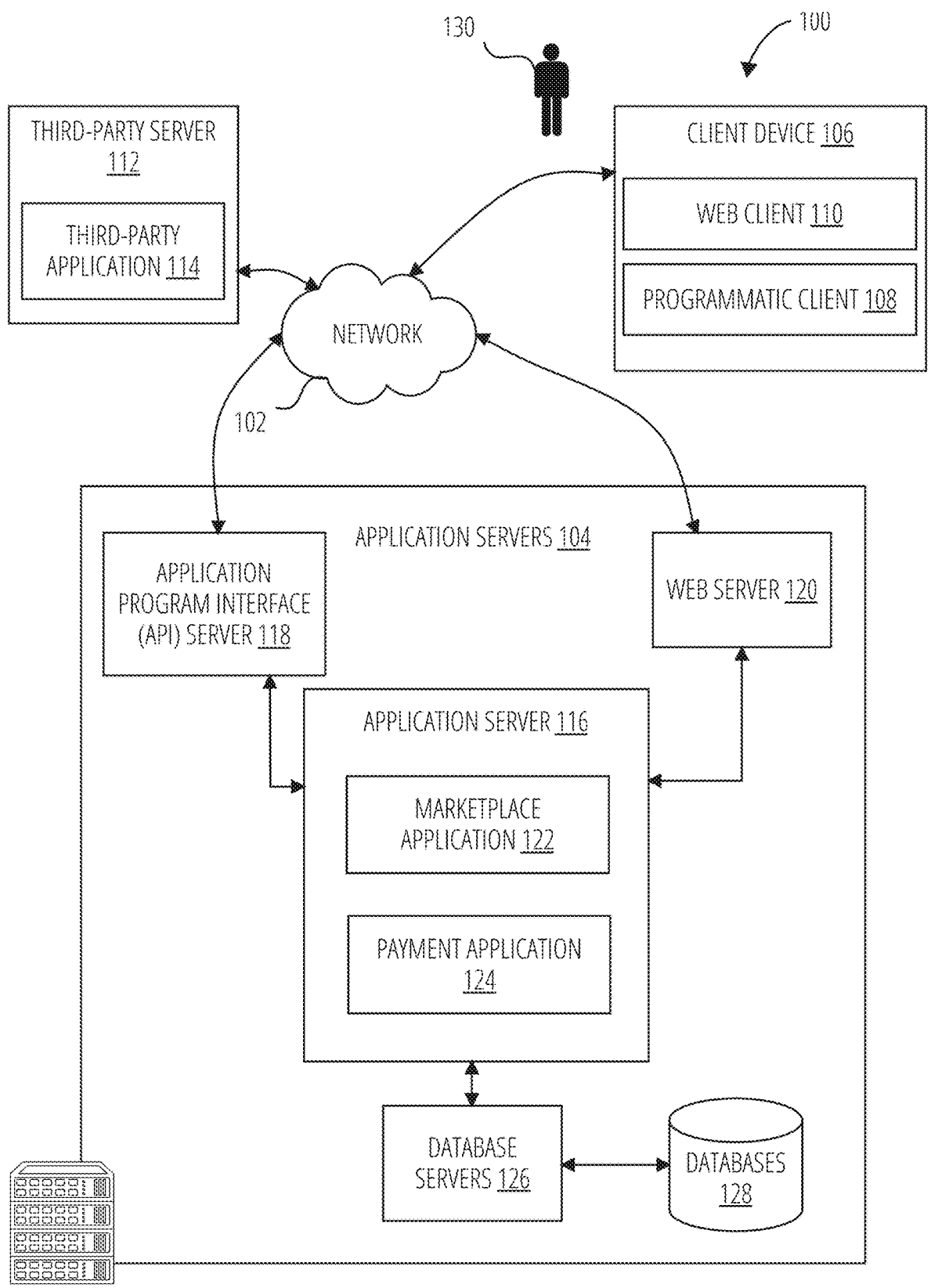
FIG. 1 is a diagrammatic representation of a networked environment in which the present disclosure may be deployed, in accordance with some example embodiments.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

A user session flow includes a series of web pages visited by the user during a user session. Each user session's activities are treated as sequence data. A learning model (e.g., Long Short-Term Memory) is built on top of this sequence data to predict the user's next activity (also referred to as predicted exit rate). A web page is modified based on the predicted next activity. For example, the predictive model can be used to generate real-time information (e.g., coupon/discount/incentive information) based on the user session behavior. For example, the web page may be modified to present a 5% off coupon if the predicted exit rate is high. The predicted exit rate can thus be used to personalize coupon/incentive scenarios. In another example, the web page may be modified to improve page context presentation based on prediction. For example, users who are ready to commit (e.g., buy) and users who are looking around have different viewing experience (e.g., different user flow sessions). For the former, the web page includes item details first while for the later ones, the web page promotes other items to the top to attract the user's attention.

In one example embodiment, a web server accesses a plurality of users' sessions. Each user session indicates a page flow of a corresponding user session for a plurality of web pages provided by the web server. The web server generates a learning model using a neural network based on the plurality of users' sessions. The learning model is configured to predict a next user activity based on a current page flow of a current user session. The next user activity indicates one of continuing the current user session by visiting another web page provided by the web server and ending the current user session. The web server dynamically adjusts a content of a web page based on the predicted next user activity.

As a result, one or more of the methodologies described herein facilitate solving the technical problem of providing information pertinent to a user browsing session. As such, one or more of the methodologies described herein may obviate a need for certain efforts or computing resources that otherwise would be involved in client devices continually browsing irrelevant web pages. As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 110. A web client 110 (e.g., a browser) and a programmatic client 108 (e.g., an "app") are hosted and execute on the web client 110. A user 130 uses the client device 106 to access data on application servers 104.

An Application Program Interface (API) server 118 and a web server 120 provide respective programmatic and web interfaces to application servers 104. A specific application server 116 hosts a marketplace application 122, which includes components, modules and/or applications.

The marketplace application 122 may provide a number of marketplace functions and services to users who access the application servers 104. The payment application 124 may likewise provide a number of payment services and functions to users. The payment application 124 may allow users to accumulate value (e.g., in a commercial currency, such as the U.S. dollar, or a proprietary currency, such as "points") in accounts, and then later to redeem the accumulated value for products (e.g., goods or services) that are made available via the marketplace application 122. While the marketplace application 122 and the payment application 124 are shown in FIG. 1 to both form part of the application servers 104, it will be appreciated that, in alternative embodiments, the payment application 124 may form part of a payment service that is separate and distinct from the application server 116.

Further, while the network environment 100 shown in FIG. 1 employs a client-server architecture, the embodiments are, of course, not limited to such an architecture, and could equally well find application in a distributed, or peer-to-peer, architecture system, for example. The various marketplace application 122 and payment application 124 could also be implemented as standalone software programs, which do not necessarily have networking capabilities.

The web client 110 accesses the various marketplace application 122 and payment application 124 via the web interface supported by the web server 120. Similarly, the programmatic client 108 accesses the various services and functions provided by the marketplace application 122 and payment application 124 via the programmatic interface provided by the Application Program Interface (API) server 118. The programmatic client 108 may, for example, be a seller application (e.g., eBay Application developed by eBay Inc., of San Jose, California) to enable sellers to author and manage listings on the network environment 100 in an offline manner, and to perform batch-mode communications between the programmatic client 108 and the application servers 104.

FIG. 1 also illustrates a third-party application 114 executing on a third-party server 112 as having programmatic access to the application servers 104 via the programmatic interface provided by the Application Program Interface (API) server 118. For example, the third-party application 114 may, utilizing information retrieved from the application server 116, support one or more features or functions on a website hosted by a third party. The third-party website may, for example, provide one or more promotional, marketplace, or payment functions that are supported by the relevant applications of the application servers 104.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 12, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client device 106 may be embodied within the network environment 100. Furthermore, some components or functions of the network environment 100 may be combined or located elsewhere in the network environment 100. For example, some of the functions of the client device 106 may be embodied at the application server 116.

Figure 2:
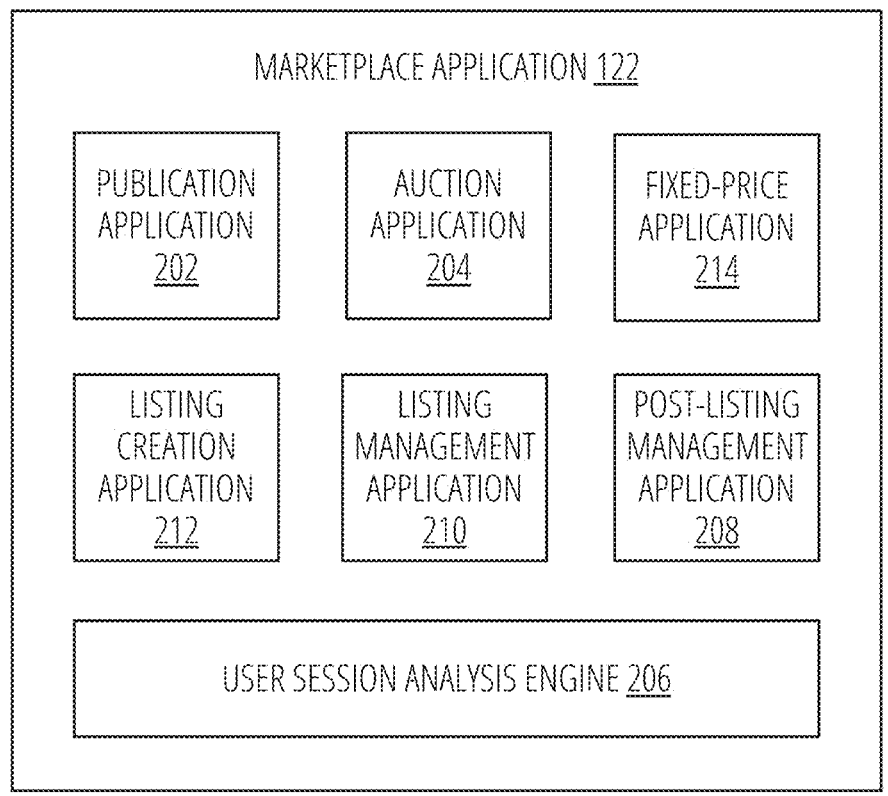
FIG. 2 is a block diagram illustrating a marketplace application that, in one example embodiment, is provided as part of a networked system.

FIG. 2 is a block diagram illustrating the marketplace application 122 that, in one example embodiment, are provided as part of the network environment 100. The marketplace application 122 may be hosted on dedicated or shared server machines (not shown) that are communicatively coupled to enable communications between or among server machines. The marketplace application 122 themselves are communicatively coupled (e.g., via appropriate interfaces) to each other and to various data sources, so as to allow information to be passed between or among the marketplace application 122 or so as to allow the marketplace application 122 to share and access common data. The marketplace application 122 may furthermore access one or more databases 128 via the database servers 126.

The application server 116 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace application 122 is shown to include at least one publication application 202 and one or more auction application 204, which support auction-format listing and price setting mechanisms (e.g., English, Dutch, Vickrey, Chinese, Double, Reverse auctions, etc.). The various auction application 204 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price application 214 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, California) may be offered in conjunction with auction-format listings and allow a buyer to purchase goods or services, which are also being offered for sale via an auction, for a fixed price that is typically higher than the starting price of the auction.

Listing creation application 212 allow sellers to conveniently author listings pertaining to goods or services that they wish to transact via the application servers 104, and listing management application 210 allow sellers to manage such listings. Specifically, where a particular seller has authored and/or published a large number of listings, the management of such listings may present a challenge. The listing management application 210 provides a number of features (e.g., auto-relisting, inventory level monitors, etc.) to assist the seller in managing such listings. The post-listing management application 208 also assists sellers with a number of activities that typically occur post-listing.

A user session analysis engine 206 enables a user to search or browse items provided by the publication application 202. For example, the user session analysis engine 206 accesses users' session data to determine session flows (e.g., series of web page browsed by each user during a web session). The user session analysis engine 206 applies a learning engine to build a model used to predict whether a user will end or continue a session. The user session analysis engine 206 dynamically modifies a web page in response to the user's activities and a prediction based on the user's activities. The user session analysis engine 206 is described in more detail below with respect to FIG. 3.

It should be noted that the term "web browser" as used in this disclosure shall be interpreted broadly to cover any application capable of displaying item attributes and rendering images from a web server. As such, this may include traditional web browsers as well as stand-alone applications (or apps) operating on mobile or other devices. For example, the web browser could be a traditional web browser such as Internet Explorer from Microsoft Corp., a stand-alone app such as a shopping application, a video player app, etc.

In another example where the web browser is a stand-alone app, it may be operating on, for example, a mobile device having a display and a camera. The techniques described herein could therefore be applied to an image obtained by the mobile device from an outside source, such as via the Internet, an image previously stored on the mobile device, or an image taken by the camera on the mobile device, potentially in real time. Indeed, the techniques described herein can be applied on any device that can obtain a digital image and transmitting portions of that digital image to another device. Mobile devices are certainly one example, but others are possible as well, such as wearables and head-mounted devices.

Figure 3:
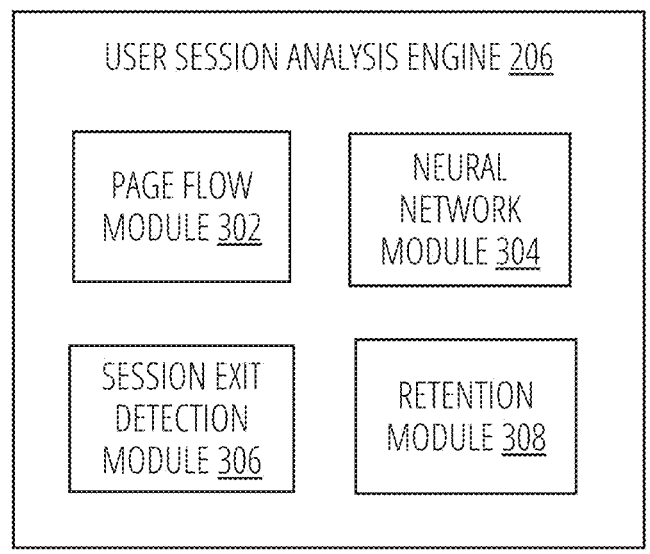
FIG. 3 is a block diagram illustrating a user session analysis engine, in accordance with one example embodiment.
Figure 5:
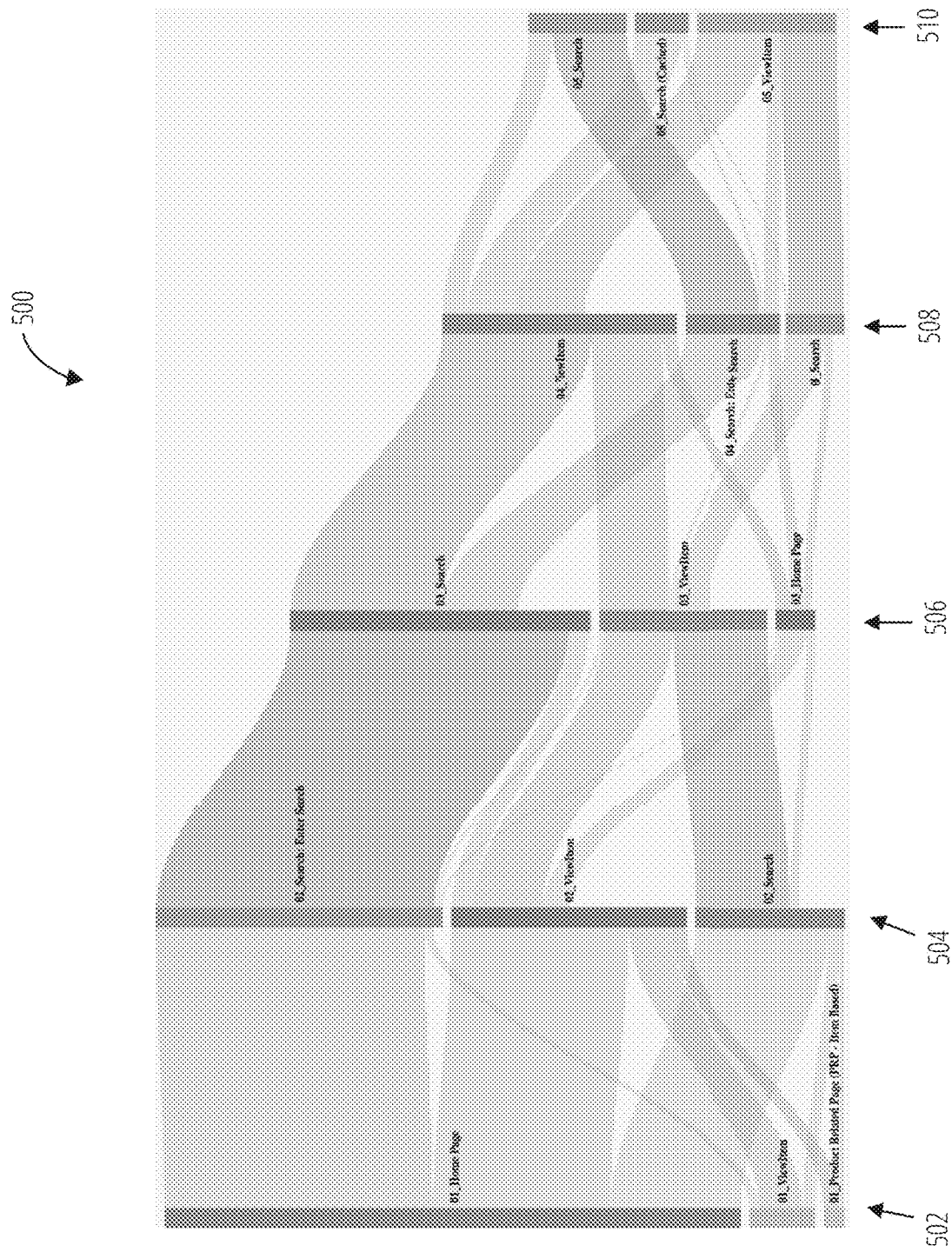
FIG. 5 illustrates an example of an analysis of users' session page flow.

FIG. 3 is a block diagram illustrating the user session analysis engine 206, in accordance with one example embodiment. The user session analysis engine 206 includes a page flow module 302, a neural network module 304, a session exit detection module 306, and a retention module 308. The page flow module 302 accesses web sessions of users to determine user session page flow. An example of users' page flow is illustrated in FIG. 5. In one example, the marketplace application 122 provides a plurality of web pages related to the listed items. The page flow module 302 analyzes an aggregate of users' sessions to determine the series of web pages requested by the users.

The neural network module 304 includes a learning engine based on neural network (e.g., LSTM). The neural network module 304 builds a model based on the aggregate data of users' session page flow provided by the page flow module 302. The neural network module 304 generates a model that predicts whether a user session is about to end. In one example, the neural network module 304 generates a model that provides a probability of a user exiting a user session. In another example, the model can be used to predict whether a user's next session activity (e.g., whether the user will continue browsing through pages provided by the marketplace application 122 or will end the web session).

The following is a sample code illustrating an operation of the neural network module 304:

network module 304 to predict the user's next activity based on the current session. In one example embodiment, the session exit detection module 306 detects whether the user will exit a current session. In another example embodiment, the session exit detection module 306 determines a probability of the user's current exit based on the flow of web pages in the current session and the model generated by the neural network module 304. The session exit detection module 306 determines whether the computed probability exceeds a predefined threshold. If the computed probability exceeds the predefined threshold, the session exit detection module 306 alerts the retention module 308. In another example embodiment, the session exit detection module 306 categorizes the user based on the computed probability or exit rate. For example, the session exit detection module 306 assigns the user to a particular group based on the exit rate. Each group may be defined based on a range of exit rate or probability. Each group may feature a different web browsing experience based on the exit rate range. For example, a group with a higher exit rate may include additional or extra modifications to a web page than a group with a lower exit rate.

The retention module 308 modifies a web page based on the computed exit rate from the session exit detection module 306. For example, the retention module 308 adjusts

```
model=Sequential([
Embedding(vocab_size, n_fac, input_length=cs, batch_input_shape=(bs,6)),
BatchNormalization( ),
LSTM(n_hidden, return_sequences=True),
TimeDistributed(Dense(vocab_size, activation='softmax')),
])
```

The above script illustrates taking various page IDs (and the words contained therein) that the user has visited to 1) predict the user's next move (e.g., probability of leaving the website/shopping flow) and 2) determine a) dynamic modifications to the existing page layout through reshuffling of the content and/or a price discount) to the contents of pages the user would normally visit or b) identify different pages altogether with wholly different content) to reduce the risk of the user leaving the flow.

An example of a) dynamic modification would be to bring to the top of the web page recommendations (that would otherwise be lower in the page). An example of b) identifying a different page altogether would be to replace a phone browsing page consisting of one phone type (e.g., Apple phones) with a distinct phone browsing page of another phone type (e.g., Samsung phones). Yet another example of b) would be surfacing used rather than new phones or alternatively various payment types at checkout.

In another example embodiment, the input for the neural network module 304 includes session sequence (e.g., all previous visited page IDs, timestamp, current page attributes, listing category). An example output of the session exit detection module 306 includes a probability of leaving a web site provided by the web server 120. In another example embodiment, the output includes a probability of restarting a user session on the web server 120.

The session exit detection module 306 applies the model to a current session of a user to predict whether the user will continue browsing to another web page to will end his/her web session. For example, the session exit detection module 306 determines the flow or series of web pages accessed by the user. The session exit detection module 306 applies the flow of web pages to the model generated by the neural a content of a web page (associated with an item) to promote other items related to the item. The retention module 308 promotes the other items by moving a portion of the web page featuring the related items to a top portion of the web page. In another example, the retention module 308 may use other visual mechanisms (e.g., pop up, dynamically adjusting a font size, highlighting a related item, animation showing the moving of the related items to the top portion of the web page) to call attention to the user.

The retention module 308 may further provide and display additional information related to the item in response to detecting a prediction of a session exit of the user. For example, the additional information may include rebate or discount information. The amount of the discount may be based on exit rate or computed probability. For example, the discount may be 5% if the user is likely to exit the session and 10% if the user is highly likely to exit the session. Furthermore, the amount of the discount may be also based on the duration of the user session flow. For example, the user may have been browsing related items for an extended period of time (e.g., by browsing several pages). The session exit detection module 306 then detects a prediction that the user is about to exit the session. The retention module 308 considers the exit rate and the length of the web session. For example, the longer the user session flow and the higher the exit rate, the higher the discount.

In another example, the modification of the content in the web page placement is based on a combination of the exit rate and the length of the web session. For example, the longer the user session flow, the higher the exit rate, the higher the amount of modification (e.g., moving a display of related items from a bottom section to a middle section of the web page vs. moving a display of related items from a bottom section to a top section of the web page).

FIG. 4 illustrates a table 400 illustrating a model structure summary in accordance with one embodiment. In one example embodiment, the get_next( ) function is a wrapper function on top of the model for purpose of outputting the result.

FIG. 5 illustrates an example of an analysis of users session page flow 500. Each bar (502, 504, 506, 508, 510) represents a user session activity (e.g., a user searching for an item, viewing an item, etc.).

Figure 6:
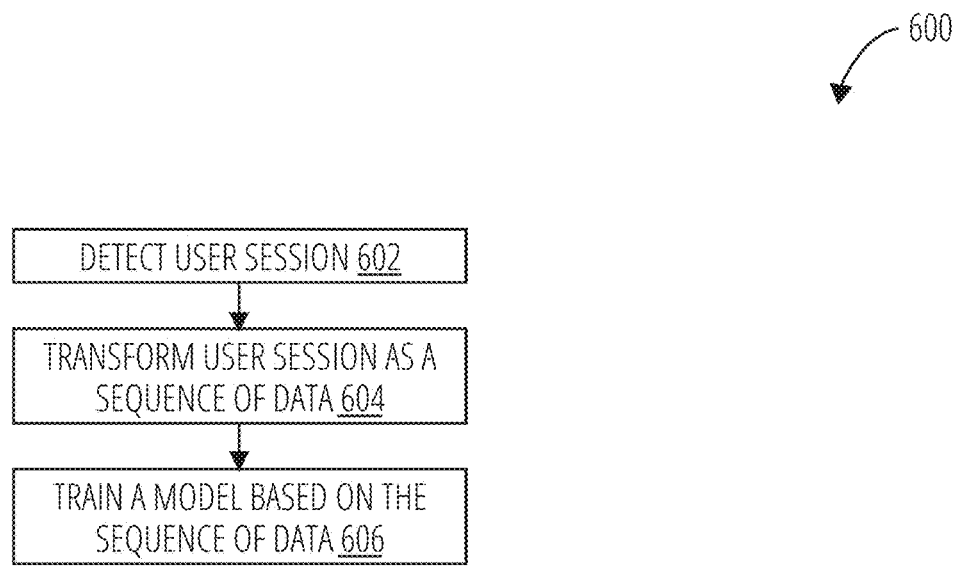
FIG. 6 is a flow diagram illustrating a method for training a model in accordance with one example embodiment.

FIG. 6 is a flow diagram illustrating a method 600 for training a model, in accordance with an example embodiment. Operations in the method 600 may be performed by the user session analysis engine 206, using components (e.g., modules, engines) described above with respect to FIG. 3. Accordingly, the method 600 is described by way of example with reference to the user session analysis engine 206. However, it shall be appreciated that at least some of the operations of the method 600 may be deployed on various other hardware configurations or be performed by similar components residing elsewhere. For example, some of the operations may be performed at the third-party server 112.

At block 602, the user session analysis engine 206 detects users' sessions. At block 604, the user session analysis engine 206 transforms the users' sessions as a sequence of data flow (as illustrated in FIG. 5). At block 606, the user session analysis engine 206 trains a model based on the sequence of data.

Figure 7:
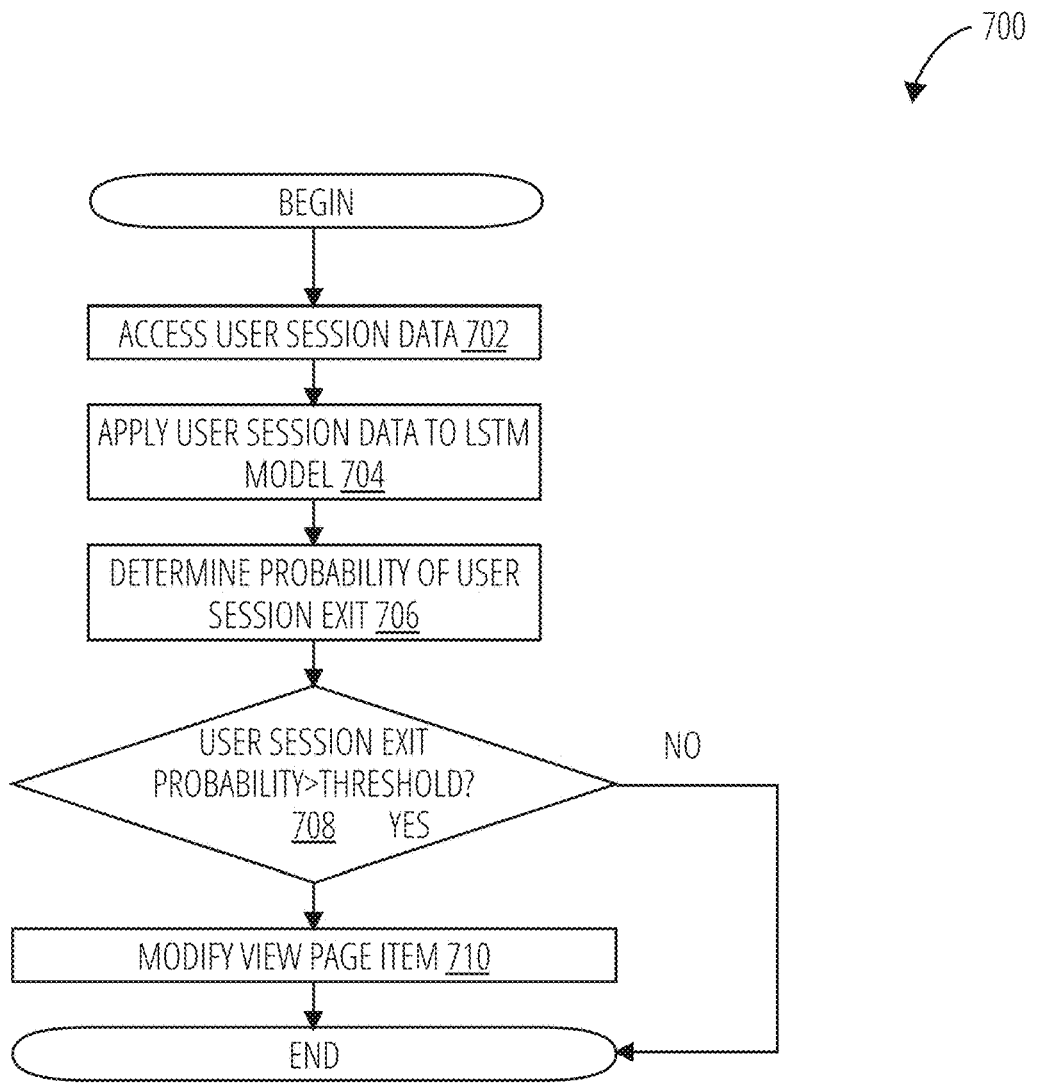
FIG. 7 is a flow diagram illustrating a method for modifying a web page in accordance with one example embodiment.

FIG. 7 is a flow diagram illustrating a method 700 for incrementing a count for an item, in accordance with an example embodiment. Operations in the method 700 may be performed by the user session analysis engine 206, using components (e.g., modules, engines) described above with respect to FIG. 3. Accordingly, the method 700 is described by way of example with reference to the user session analysis engine 206. However, it shall be appreciated that at least some of the operations of the method 700 may be deployed on various other hardware configurations or be performed by similar components residing elsewhere. For example, some of the operations may be performed at the third-party server 112.

At block 702, the page flow module 302 accesses users' session data (e.g., sequence of web pages accesses by a user during a user session). A user session may be defined as a browsing session within a predefined time duration or by opening and closing a browser/browser tab). At block 704, the neural network module 304 applies the aggregate data (user's session data) from page flow module 302 to a Recurrent Neural Network such as LSTM model. At block 706, the session exit detection module 306 determines a probability of a current user session exit based on the model generated at block 704. At decision block 708, the session exit detection module 306 determines whether the computed probability exceeds a predefined threshold. At block 710, in response to determining that the computed probability exceeds the predefined threshold, the retention module 308 modifies a web page. The web page is identified in response to a previous user activity (e.g., user clicked on a hyperlink on a previous page that brings the user to the "current" web page). In one example embodiment, the extent or degree of modifications to the web page is based on the predicted exit rate. In another example embodiment, the extent or degree of modifications to the web page is based on the predicted exit rate and the length of the current user session.

Figure 8:
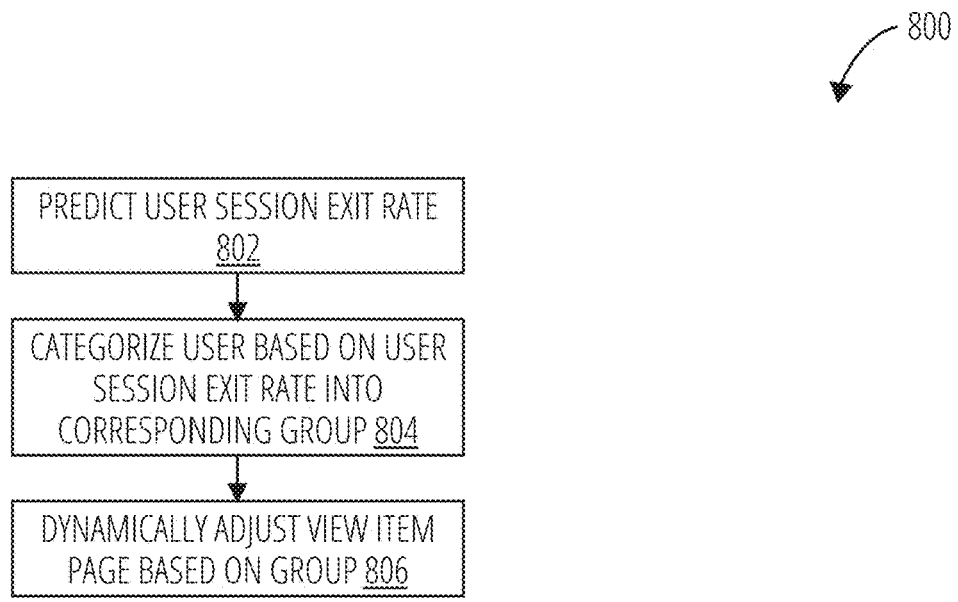
FIG. 8 is a flow diagram illustrating a method for dynamically adjusting content in a web page in accordance with one example embodiment.

FIG. 8 is a flow diagram illustrating a method 800 for incrementing a count for an item, in accordance with an example embodiment. Operations in the method 800 may be performed by the user session analysis engine 206, using components (e.g., modules, engines) described above with respect to FIG. 3. Accordingly, the method 800 is described by way of example with reference to the user session analysis engine 206. However, it shall be appreciated that at least some of the operations of the method 800 may be deployed on various other hardware configurations or be performed by similar components residing elsewhere. For example, some of the operations may be performed at the third-party server 112.

At block 802, the session exit detection module 306 predicts a user session exit rate based on the model. At block 804, the session exit detection module 306 categorizes the user based on the user session exit rate into a corresponding group. Each group may be based on a range of user session exit rates. For example, Group 1 may be based on a low user session exit rate. Group 2 may be based on a medium user session exit rate. Group 3 may be based on a high user session exit rate. The low, medium, high may be based on predefined user session exit rates. At block 806 the retention module 308 dynamically adjusts the web page based on the group assigned to the user previously in block 804.

Figure 9:
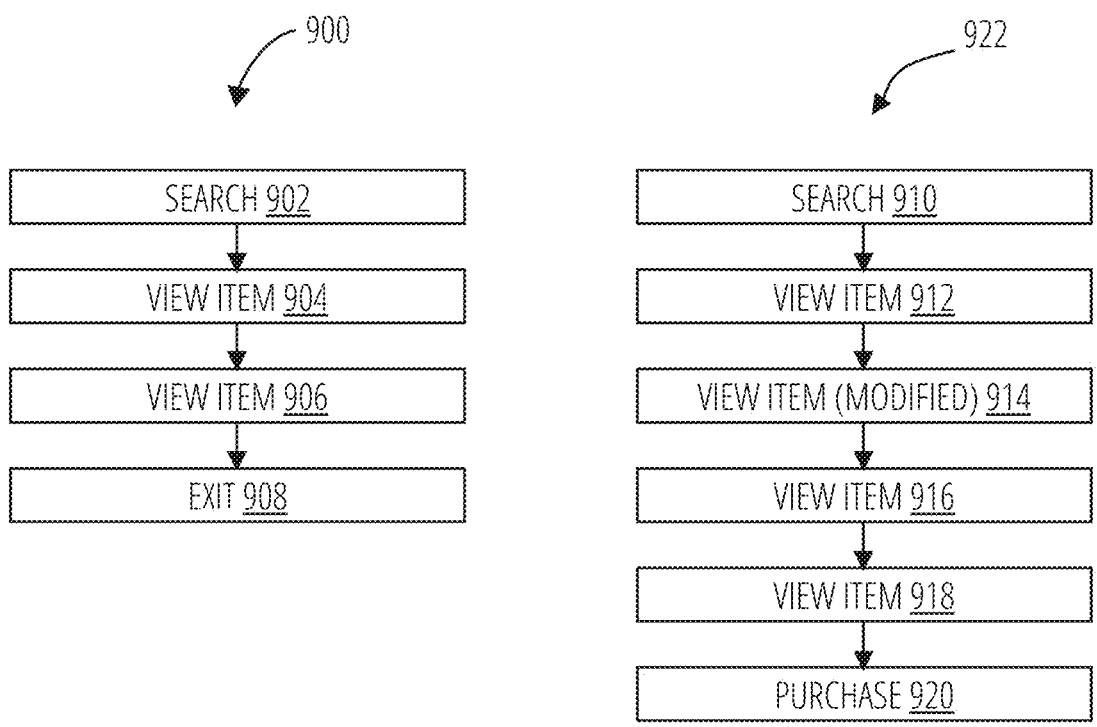
FIG. 9 are flow diagrams illustrating examples of user flow sessions.
Figure 10:
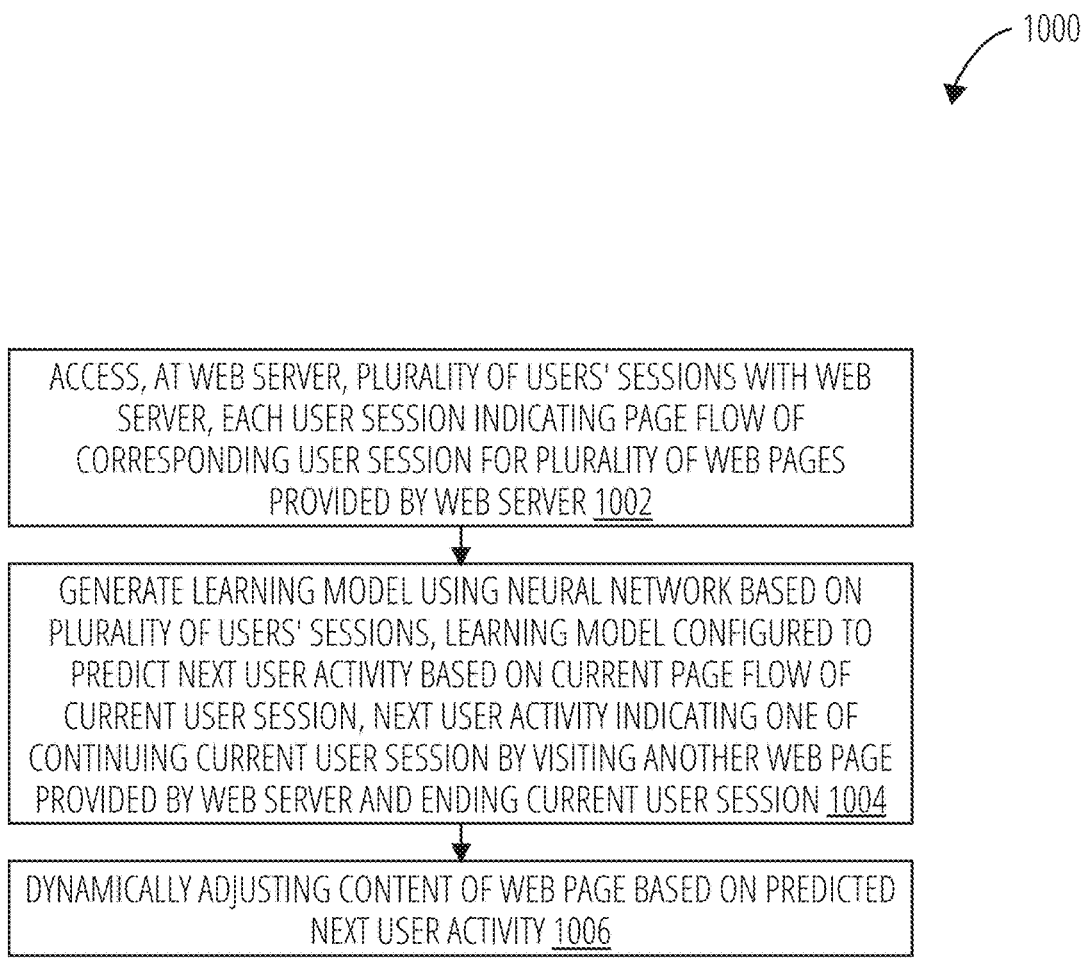
FIG. 10 illustrates a routine in accordance with one embodiment.

FIG. 9 illustrates examples of user session flows. The session flow 900 illustrates a user session flow without intervention (e.g., without using the user session analysis engine 206). For example, the session flow 900 includes the following sequence: search 902, view item 904, view item 906, and exit 908. The session flow 922 illustrates a user session flow with intervention (e.g., using the user session analysis engine 206). For example, the session flow 922 includes the following sequence: search 910, view item 912, view item (modified) 914, view item 916, view item 918, and purchase 920.

In block 1002, routine 1000 accesses, at a web server, a plurality of users' sessions with the web server, each user session indicating a page flow of a corresponding user session for a plurality of web pages provided by the web server. In block 1004, routine 1000 generates a learning model using a neural network based on the plurality of users' sessions, the learning model configured to predict a next user activity based on a current page flow of a current user session, the next user activity indicating one of continuing the current user session by visiting another web page provided by the web server and ending the current user session. In block 1006, routine 1000 dynamically adjusting a content of a web page based on the predicted next user activity.

Figure 11:
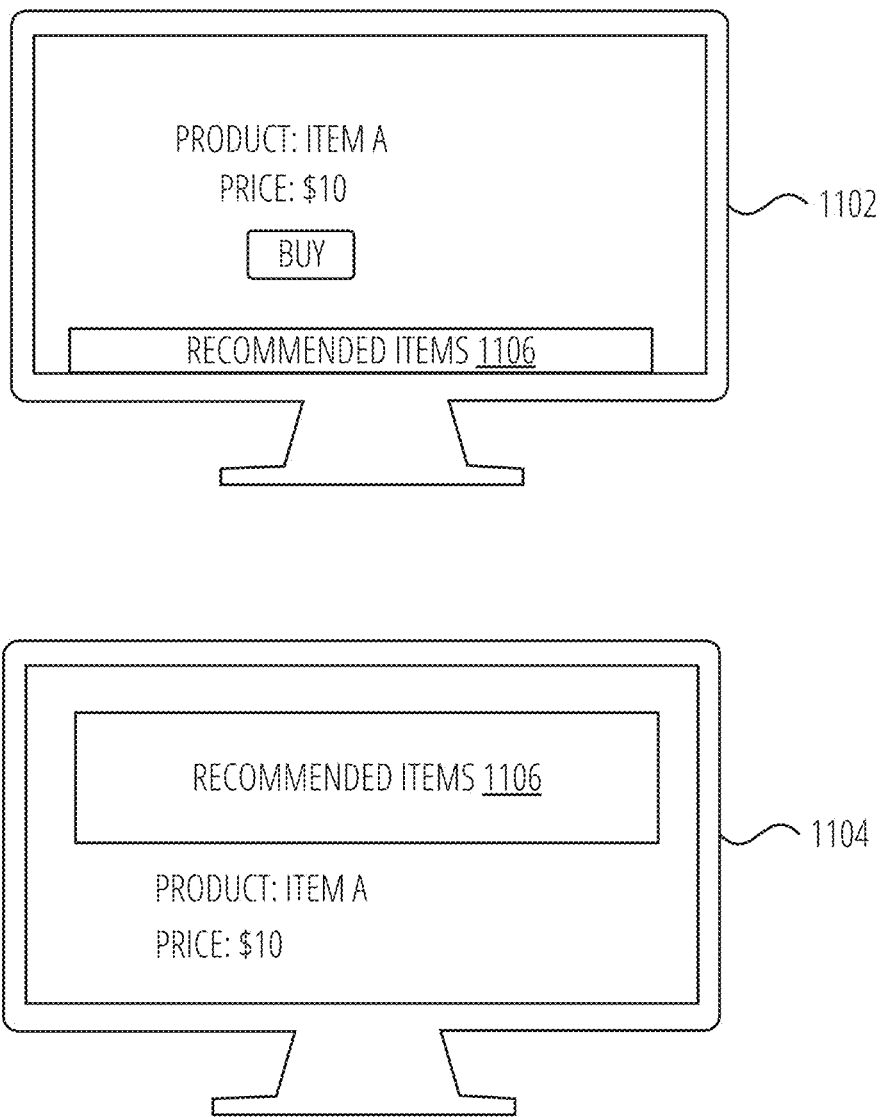
FIG. 11 is a block diagram illustrating an example of a display for a client device performing a search query, in accordance with one example embodiment.

FIG. 11 is a block diagram illustrating an example operation of the user session analysis engine 206, in accordance with one example embodiment. An example of a web page 1102 identifies the product item, the corresponding listed price (e.g., 10), and recommended items 1106 at a bottom portion of the web page 1102 at the client device 106. An example of a modified web page 1104 is displayed in response to detecting a prediction of user session exit. The modified web page 1104 shows that the web page 1102 has been modified to bring the recommended items 1106 to a top portion of the web page 1104.

Figure 12:
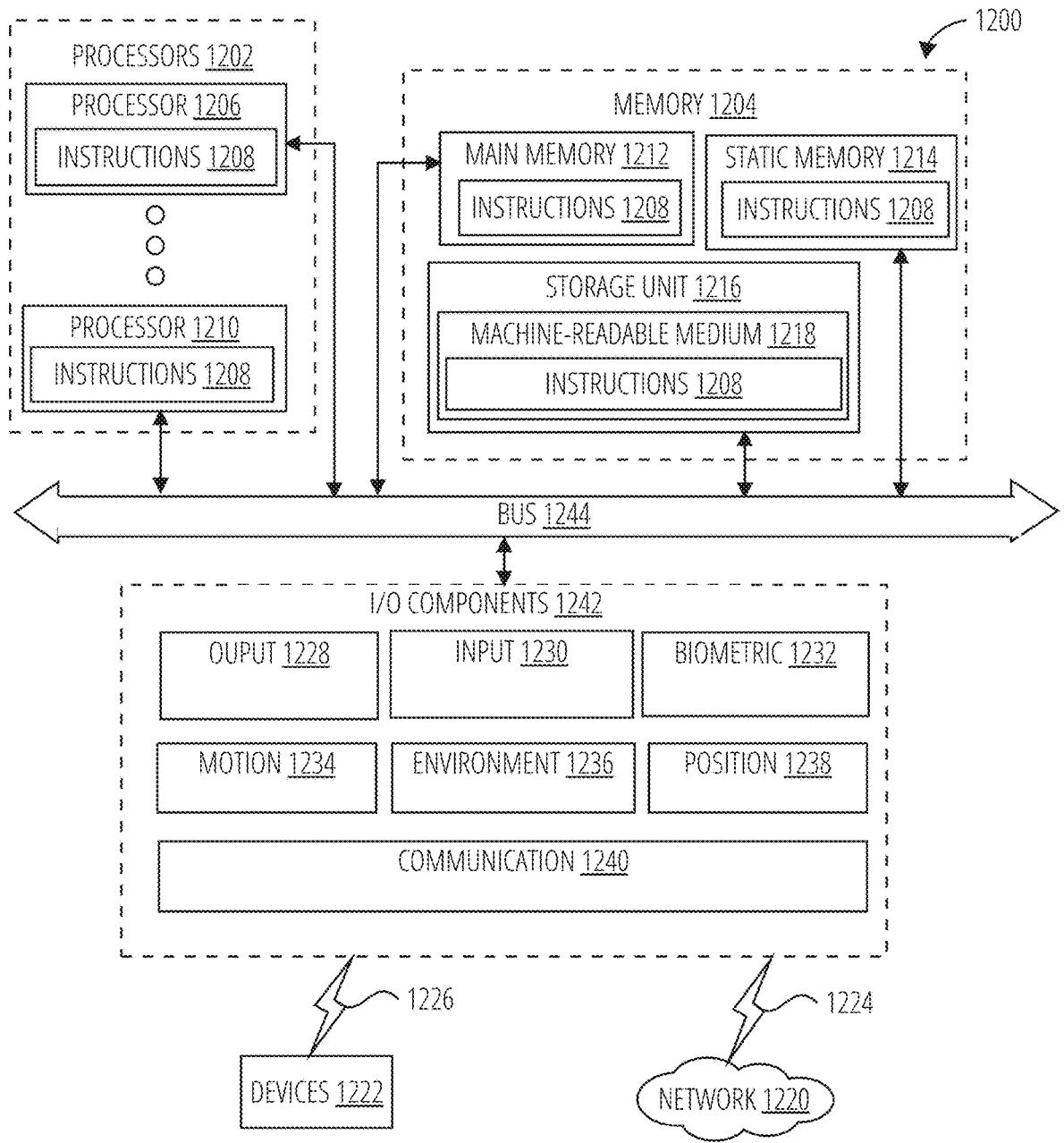
FIG. 12 is a diagrammatic representation of a machine in the form of a computer system within which a set of instructions may be executed for causing the machine to perform any one or more of the methodologies discussed herein, according to an example embodiment.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include processors 1202, memory 1204, and I/O components 1242, which may be configured to communicate with each other via a bus 1244. In an example embodiment, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the processor's cache memory), or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones may include a touch input device or other such input mechanisms, while a headless server machine will likely not include such a touch input device. It will be appreciated that the I/O components 1242 may include many other components that are not shown in FIG. 12. In various example embodiments, the I/O components 1242 may include output components 1228 and input components 1230. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1242 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1242 further include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the processors 1202) and/or storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed embodiments.

The instructions 1208 may be transmitted or received over the network 1220, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

EXAMPLES

Example 1 is a computer-implemented method. The method comprises: accessing, at a web server, a plurality of users' sessions with the web server, each user session indicating a page flow of a corresponding user session for a plurality of web pages provided by the web server; generating a learning model using a neural network based on the plurality of users' sessions, the learning model configured to predict a next user activity based on a current page flow of a current user session, the next user activity indicating one of continuing the current user session by visiting another web page provided by the web server and ending the current user session; and dynamically adjusting a content of a web page based on the predicted next user activity.

In example 2, the subject matter of example 1 can optionally include: determining that the next user activity indicates ending the current user session; in response to determining that the next user activity indicates ending the current user session, modifying a content of a first web page of the plurality of web pages, the first web page identified based on the current user session, the modified content comprising related items from one or more web pages; and providing the modified content of the first web page to a client device associated with the current user session.

In example 3, the subject matter of example 1 can optionally include: accessing the current page flow of the current user session; and determining, based on the learning model, a probability that the next user activity includes ending the current user session.

In example 4, the subject matter of example 3 can optionally include: determining that the probability exceeds a probability threshold; generating a modified content of the web page in response to the probability exceeding the probability threshold; and providing the modified content of the web page to a client device associated with the current user session.

In example 5, the subject matter of example 3 can optionally include: forming a plurality of view item experience groups, each group being based on a probability threshold, and wherein dynamically adjusting the content of the web page is based on the plurality of view item experience groups.

In example 6, the subject matter of example 5 can optionally include: wherein a first view experience group corresponds a first modification of the web page, wherein a second view experience group corresponds to a second modification of the web page, the first view experience group being based on a first probability threshold, the second view experience group being based on a second probability threshold.

In example 7, the subject matter of example 1 can optionally include: wherein the dynamically adjusting the content of the web page further comprises: adjusting a layout of the web page by moving a bottom portion of the web page to a top portion of the web page; and providing the modified layout of the web page to a client device associated with the current user session.

In example 8, the subject matter of example 7 can optionally include: wherein the bottom portion of the web page identifies related items from one or more web pages related to an item featured in the web page.

In example 9, the subject matter of example 1 can optionally include: wherein the dynamically adjusting the content of the web page further comprises: identifying a second web page from an item category different from the item category of an item associated with the current user session; and presenting the second category web page to the client device.

In example 10, the subject matter of example 1 can optionally include: wherein the learning model includes a long short-term memory (LSTM) of the neural network.

What is claimed is:

1. A method comprising:
   determining, at a web server, that a next user activity indicates ending a current user web session at a client device;
   determining a probability of the user ending the current user web session at the client device;
   assigning the user to a group based on the probability, each group having a corresponding level of modification to a structure, content, and layout of a web page;
   in response to determining that the next user activity indicates ending the current user web session, modifying an existing first web page to generate a modified layout based on the corresponding level of modification of the group assigned to the user by changing content and moving content from a lower portion of the first web page to an upper portion of the first web page by a displacement amount that is based on a length of the current user web session and a likelihood exit rate of the current user web session, the length of the current user web session including a duration that the client device visits a series of web pages from a website; and
   providing a second web page to the client device, the second web page including the modified layout of the first web page.

2. The method of claim 1, further comprising:
   accessing, at the web server, a plurality of web sessions, each web session indicating a page flow of a plurality of web pages that are provided the web server; and
   generating a learning model using a neural network based on the plurality of web sessions.

3. The method of claim 2, wherein determining that the next user activity indicates ending the current user web session is based on the learning model and a current page flow of the current user web session.

4. The method of claim 3, further comprising:
   in response to determining that the next user activity indicates ending the current user web session, generating a modified content of the web page; and
   providing the modified content of the web page to the client device.

5. The method of claim 4, wherein the modified content indicates related items from one or more web pages of the current user web session.

6. The method of claim 2, further comprising:
   accessing a current page flow of the current user web session; and
   determining, based on the learning model, a probability that the next user activity includes ending the current user web session.

7. The method of claim 6, further comprising:
   determining that the probability exceeds a probability threshold; and
   generating the modified layout of the web page is in response to the probability exceeding the probability threshold.

8. The method of claim 2, wherein the learning model includes a long short-term memory (LSTM) of the neural network.

9. The method of claim 1, wherein generating the modified layout of the web page further comprises:
   re-arranging a display order of portions of the web page, wherein an amount of modification of the modified layout of the web page is based on a combination of a length of the current user session and a likelihood exit rate of the current user session.

10. The method of claim 1, wherein generating the modified layout of the web page further comprises:
    identifying a second web page from an item category different from the item category of an item associated with the current user web session; and
    presenting the second web page to the client device.

11. A computing apparatus, the computing apparatus comprising:
    a processor; and
    a memory storing instructions that, when executed by the processor, configure the computing apparatus to perform operations comprising:
    determining, at a web server, that a next user activity indicates ending a current user web session at a client device;
    determining a probability of the user ending the current user web session at the client device;
    assigning the user to a group based on the probability, each group having a corresponding level of modification to a structure, content, and layout of a web page;
    in response to determining that the next user activity indicates ending the current user web session, modifying an existing first web page to generate a modified layout based on the corresponding level of modification of the group assigned to the user by changing content and moving content from a lower portion of the first web page to an upper portion of the first web page by a displacement amount that is based on a length of the current user web session and a likelihood exit rate of the current user web session, the length of the current user web session including a duration that the client device visits a series of web pages from a website; and
    providing a second web page to the client device, the second web page including the modified layout of the first web page.

12. The computing apparatus of claim 11, wherein the operations further comprise:
    accessing, at the web server, a plurality of web sessions, each web session indicating a page flow of a plurality of web pages that are provided the web server; and generating a learning model using a neural network based on the plurality of web sessions.

13. The computing apparatus of claim 12, wherein determining that the next user activity indicates ending the current user web session is based on the learning model and a current page flow of the current user web session.

14. The computing apparatus of claim 13, wherein the operations further comprise:
in response to determining that the next user activity indicates ending the current user web session, generating a modified content of the web page; and
providing the modified content of the web page to the client device.

15. The computing apparatus of claim 14,
wherein the modified content indicates related items from one or more web pages of the current user web session.

16. The computing apparatus of claim 12, wherein the operations further comprise:
accessing a current page flow of the current user web session; and
determining, based on the learning model, a probability that the next user activity includes ending the current user web session.

17. The computing apparatus of claim 16, wherein the operations further comprise:
determining that the probability exceeds a probability threshold; and
generating the modified layout of the web page is in response to the probability exceeding the probability threshold.

18. The computing apparatus of claim 11, wherein generating the modified layout of the web page further comprises:
re-arranging a display order of portions of the web page, wherein an amount of modification of the modified layout of the web page is based on a combination of a length of the current user session and a likelihood exit rate of the current user session.

19. The computing apparatus of claim 11, wherein generating the modified layout of the web page further comprises:
identifying a second web page from an item category different from the item category of an item associated with the current user web session; and
presenting the second web page to the client device.

20. A non-transitory computer-readable storage medium, the computer-readable storage medium including instructions that when executed by a computer, cause the computer to perform operations comprising:
determining, at a web server, that a next user activity indicates ending a current user web session at a client device;
determining a probability of the user ending the current user web session at the client device;
assigning the user to a group based on the probability, each group having a corresponding level of modification to a structure, content, and layout of a web page;
in response to determining that the next user activity indicates ending the current user web session, modifying an existing first web page to generate a modified layout based on the corresponding level of modification of the group assigned to the user by changing content and moving content from a lower portion of the first web page to an upper portion of the first web page by a displacement amount that is based on a length of the current user web session and a likelihood exit rate of the current user web session, the length of the current user web session including a duration that the client device visits a series of web pages from a website; and
providing a second web page to the client device, the second web page including the modified layout of the first web page.

* * * * *